J. G. MINER.
Cultivator Teeth.
No. 104,754.
Patented June 28, 1870.
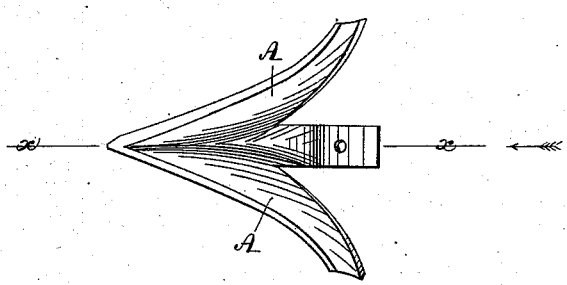

UNITED STATES PATENT OFFICE.

JAMES G. MINER, OF NASHVILLE, TENNESSEE.

IMPROVEMENT IN CULTIVATOR-PLOWS.

Specification forming part of Letters Patent No. 104,754, dated June 28, 1870.

*To all whom it may concern:*

Be it known that I, JAMES G. MINER, of Nashville, in the county of Davidson and State of Tennessee, have invented a new and useful Improvement in Cultivator-Plows; and I do hereby declare that the following is a full, clear, and exact description thereof, which will enable others skilled in the art to make and use the same, reference being had to the accompanying drawings, forming part of this specification, in which—

Figure 1 is a top, and Fig. 2 a longitudinal sectional view, of my improved plow.

My invention relates to that class of cultivator-plows which are intended to run between growing crops to cut up the grass and throw the soil slightly toward the plants.

My invention consists in elongating the implement from front to rear, then by reducing the angle formed by the extended wings from near a right angle, as generally constructed, to one ranging from twenty-three to forty-five degrees. I also form a cutting-edge upon the same by bending or turning up all around the front of the implement a ledge from one inch to three in width, which ledge lies flat upon the ground, thus ever presenting a thin sharp cutting-edge from the extremity of one wing to the other.

A in the drawings represents the plow, whose steel cutting-edge is welded in the usual manner, the angle being reduced, and the horizontal cutting-edge presented always to the front, while the wings are turned upward and outward slightly and gradually. The size generally employed will be about three feet across the wings, which will enable it to clean out all the land between two cotton-rows three and a half feet apart at one passage. By reason of the acuteness of its angle, and the self-sharpening effect of the equal wear on both sides of the cutter, it will run very smoothly and uniformly, so that one horse will be able to accomplish as much or more work than two horses with an ordinary shovel or gang plow in a given time.

The lower surface, it will be perceived, extends out to form a firm base, and lies evenly and horizontally, so as to avoid any tendency to rock. The shank is secured to the frame of the plow in any suitable manner.

The mode of operation is as follows: The greatest width of the plow across the wings being equal to a distance preferably of about six inches less than that between the plants, the plowman drives his horse in the middle of the row. The horizontal steel edge running under the soil cuts up the weeds, and passes them, with the crumbling dirt, behind the plow or toward the plants. Thus the whole intermediate space between the plants is brought to a fine tilth and the weeds destroyed, while the soil thrown against the stems of the plants smothers those weeds that have not been cut.

Having thus described all that is necessary to a clear understanding of my invention, what I esteem to be new, and desire to secure by Letters Patent, is—

A cultivator-plow formed in one piece, with wings widening from front to rear to form an acute angle, and having a steel share formed of a turned-up ledge, converging toward the center and lying flat upon the ground, whereby a very small frictional resistance is attained, the share is made a self-sharpener, and the entire space between two rows cut out at a single passage.

The above specification of my invention signed by me this 27th day of January, 1870.

J. G. MINER.

Witnesses:
 GEORGE W. MABEE,
 JAMES T. GRAHAM.